Patented Jan. 26, 1954

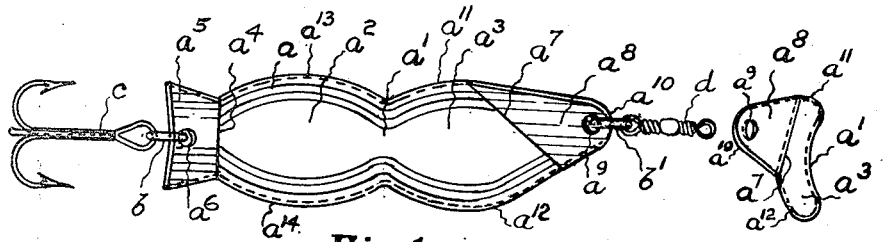

2,667,007

UNITED STATES PATENT OFFICE 2,667,007

ERRATIC FISHING LURE

William Ernest Heron, Detroit, Mich.

Application January 2, 1951, Serial No. 204,040

1 Claim. (Cl. 43—42.5)

This invention relates to mechanical fishing lures, and is primarily concerned with a lure which is capable of an infinite variety of movements in the water.

The object of this invention is to have a lure which can rotate eccentrically and wobble like a fish as it is drawn through the water.

These objects and the various embodiments of the same will be fully described in detail and in reference to the drawing.

In the accompanying drawing Fig. 1 is a plan view of the lure.

Fig. 2 is a side elevation.

Fig. 3 is a true plan view of one half of lure with the split ring and fishing hook removed.

Fig. 4 is a true plan view of the opposite half of the lure with the split ring and swivel removed.

Fig. 5 is an end view of the head end of the lure.

Fig. 6 is a section on the line 6—6 of Fig. 2.

Fig. 7 is a plan view of another embodiment of the invention.

Fig. 8 is a side elevation view of the lure shown in Fig. 7.

And Fig. 9 is an end view of the lure shown in Fig. 7.

As shown in Fig. 1 and Fig. 2, the lure comprises a body formed into a fish-like shape $a$, preferably made from sheet metal, but it could be made from other material such as wood or plastic. From the center $a^1$ longitudinally the metal from each side $a^2$ and $a^3$ respectively is formed upwards to the required angle, and at the same time the cross-section as shown in Fig. 6 on the line 1—1 is curved downwards from the center continuing to the line $a^4$ of the tail end. The remaining metal is flat and shaped tail-like as at $a^5$. Near the tail end is a hole $a^6$ for the reception of the split ring $b$ to which the fishing hook $c$ is attached. From the said center $a^1$ the cross-section curve continues to the angle line $a^7$ of the head end $a^8$. The remaining metal of the head end is flat and bent further upwards and at the same time sloping inwards on the angle line $a^7$ as shown in Figs. 1 and 2. A hole $a^9$ with the radius $a^{10}$ is offset from the center of the width of lure. From the radius $a^{10}$ the edges are tangent with the curves $a^{11}$ and $a^{12}$ respectively which narrows to the center edges $a^1$ of the lure. The said hole $a^9$ is for the reception of the split ring $b^1$ to which the swivel $d$ is attached. The curved edges $a^{13}$ and $a^{14}$ respectively of the tail end also narrow to the center edge $a^1$. The bend at $a^4$ extend transversely of the body from one side edge to the opposite side edge thereof in a plane at a right angle to the longitudinal axis of the body inwardly of the tail end. The bend at $a^7$ likewise extends transversely of the body from one side edge to the opposite side edge thereof and is disposed in a plane diagonally to the longitudinal axis of the body inwardly from the head end thereof.

Another embodiment of the lure as shown in Figs. 7, 8, and 9, respectively, and is similar in construction to the lure stated above, except that this lure being smaller, it is desired to have a portion of the center longitudinally straight a short distance instead of bent abruptly from the center longitudinally as shown in Fig. 2.

In the form shown in Fig. 7. The lure $e$ is made from a length of thin sheet metal, and the outer end $e^1$ has a radius $e^2$ at the center of the lure smaller than its width and from the said radius the edges $e^3$ and $e^4$ respectively taper out to the outer width edges $e^5$ and $e^6$. The opposite head end of the lure $e^7$ has a radius $e^8$ tangent with the upper width edge $e^5$ and from the said radius the edge $e^9$ tapers to the lower width edge $e^6$. The hole $e^{10}$ near radius $e^2$ of the tail end is for the reception of the split ring $f$ with fishing hook $g$ attached, and the hole $e^{11}$ near the radius $e^8$ of the head end is for the reception of the split ring $f^1$ with swivel $g$ attached. As stated above it is desired to have a portion of the center of this lure straight a short distance longitudinally and in reference to Fig. 7 the bend line $e^{12}$ is a short distance from the transverse center and is in a plane at a right angle to the longitudinal axis of the lure and the bend line $e^{13}$ is in a plane at an angle to the longitudinal axis and extends transversely of the lure. Between the said lines $e^{12}$ and $e^{13}$ respectively the lure may be curved similar to above lure as shown in Fig. 6 or it could be left flat and at the same time the tail end $e^1$ is formed upwards the required angle. At the same forming operation the plane of the head end is formed on the line $e^{13}$, and bent upwards to the angle required and at the same time slopes inwards on the said line $e^{13}$. The arrangement and extent of the bends $e^{12}$ and $e^{13}$ correspond to the bends $a^4$ and $a^7$ respectively in the previous embodiment.

When in use the lure is cast into the water and when drawn in, the lure rotates or wobbles side to side in an erratic fashion caused by the plane of the head end tilted upwards and inwards and in conjunction with the portion $a^1$ being away from the axis line between the two holes $e^{10}$ and $a^{11}$, of the tail and head ends respectively, thus being out of balance gives that unlimited movements during the drawing in of the lure, also with the added help of jerking of the line abruptly at short uneven pulls at intervals during the winding in of the line, the action of the lure being like a small minnow darting to and fro.

These lures are also intended for use in trolling. The line can also be jerked abruptly in short uneven pulls at intervals during the travel of the boat.

It is to be understood that the form of my invention herewith shown and described is to be taken as preferred examples of the same, and that various changes in the shape and size may be resorted to without departing from the spirit of the invention or the scope of the subjoined claim.

It will be noted that in both forms there is adjacent one end a line of bend indicated in Fig. 1 by the numeral $a^4$ and indicated in Fig. 7 by the numeral $e^{12}$. This line of bend extends at right angles to the longitudinal axis and extends transversely of the body.

Adjacent the opposite end there is a line of bend indicated in Fig. 1 by the numeral $a^7$ and in Fig. 7 by the numeral $e^{13}$. This line of bend extends transversely of the body but diagonally to the longitudinal axis of the body. The diagonally extended line is also positioned inwardly from the forward end of the body a greater distance than is the transverse extended line $a^4$ or $e^{12}$ from the rearward end of the body.

What I claim as new and desire to secure by Letters Patent is:

A fish lure of the class described comprising a body in the form of an elongated plate having opposite side and end edges, said body having a bend extending transversely thereof from one side edge to the opposite side edge at right angles to the longitudinal axis of the body inwardly of one end, and said body having a second bend extending transversely of the longitudinal axis of said body diagonally from one side edge to the opposite side edge thereof inwardly from the opposite end of the body.

WILLIAM ERNEST HERON.

References Cited in the file of this patent

UNITED STATES PATENTS

| Number | Name | Date |
| --- | --- | --- |
| 1,317,890 | Patton | Oct. 7, 1919 |
| 1,852,620 | Martin | Apr. 5, 1932 |
| 1,997,802 | Meyer | Apr. 16, 1935 |
| 2,256,346 | Mathie | Sept. 16, 1941 |
| 2,481,710 | Arndt | Sept. 13, 1949 |
| 2,542,606 | Westerfors | Feb. 20, 1951 |
| 2,588,720 | Heiland | Mar. 11, 1952 |

FOREIGN PATENTS

| Number | Country | Date |
| --- | --- | --- |
| 84,351 | Sweden | Sept. 17, 1935 |